Sept. 28, 1965 W. J. SCHMIDT 3,209,130
DIGITAL MEASURING DEVICE
Filed April 30, 1962 7 Sheets-Sheet 1

INVENTOR
Warren J. Schmidt
BY
ATTORNEY

Sept. 28, 1965  W. J. SCHMIDT  3,209,130

DIGITAL MEASURING DEVICE

Filed April 30, 1962  7 Sheets-Sheet 5

Sept. 28, 1965                W. J. SCHMIDT                3,209,130
                         DIGITAL MEASURING DEVICE
Filed April 30, 1962                                    7 Sheets-Sheet 6

United States Patent Office 3,209,130
Patented Sept. 28, 1965

3,209,130
DIGITAL MEASURING DEVICE
Warren J. Schmidt, Upper Montclair, N.J., assignor to Westinghouse Electric Corporation, East Pittsburgh, Pa., a corporation of Pennsylvania
Filed Apr. 30, 1962, Ser. No. 191,221
15 Claims. (Cl. 235—92)

This invention relates generally to an improved digital integrator having an adjustable input versus stored count ratio. More particularly, it relates to a digital pulse integrator wherein the number of input pulses integrated is varied in accordance with a set pattern controlled by the input pulses.

Digital counters or integrators are often applied to systems such as paper machine winders and steel pipe cut off machines to keep track of the amount of material being processed. In these systems a pick up device may be made to operate from some roll in the system whose circumference is in non-sliding contact with the material being measured. Ideally the pick up device is arranged so that it produces one pulse for each unit of circumference so that a totalization of the pulses provides an accurate measurement of the material. In some cases it is very difficult to achieve the production of pulses with the degree of accuracy desired or if the original set up has the desired accuracy it is difficult to compensate the pulse frequency for any change in size that might take place in the measuring roll due to wear or otherwise. Any deviation from the one to one relationship shows up as an error between the counter's indication and the actual quantity of material processed.

It is a general object of this invention to avoid and overcome the foregoing and other difficulties of and objections to prior art practices by adding to or subtracting from the number of supplied pulses in such a manner that the resultant number of pulses supplied to the pulse counting mechanism will not cause a progressively increasing counting error but will maintain the mechanism within an acceptable error.

Another object is to provide a better and more useful digital integrator wherein input pulses are skipped in accordance with the input signal whereby the stored count in the digital integrator is made any desired ratio with respect to the number of input pulses.

Another object is to provide a better measuring device which uses a digital integrator to measure a given amount of material and then cut off the material while resetting the digital integrator for the next measurement.

Another object is to provide a better and more useful digital integrator wherein the stored count is varied with respect to the number of input pulses by adding or subtracting pulses in accordance with the number of input pulses fed to the digital integrator.

The aforesaid objects of the invention and other objects will become apparent as the description proceeds and are achieved by providing a digital tachometer which feds pulses in accordance with the speed of the material to be measured through an electrical gate circuit to a main digital counter which totalizes the pulses. If the ratio of input pulses to unit of measure (i.e. length of strip) is unity, the gate will allow every pulse from the digital tachometer to be fed to the main counter. As the diameter of the measuring roll in contact with the material changes, due to normal wear or because a refinishing operation has been performed or for any other reason, the number of pulses produced by the tachometer for the same number of units of material changes. If for example the diameter of the measuring roll decreases the number of pulses produced per peripherial foot increases so that a totalization of the supplied pulses would give an erroneous measurement. To compensate for this increase in the number of pulses, means is provided in the form of a skip count selector to prevent certain of the pulses generated by the tachometer from being delivered to the counter or otherwise counted. The skip selector operates by periodically closing the gate between the digital tachometer and the main counter to thereby prevent the pulses which are to be skipped from reaching the main counter.

The system can be made to work equally well under conditions in which the tachometer pulse rate is too slow by periodically adding counts instead of skipping them. In this instance, the skip count selector is replaced by an add count selector which adds pulses to be counted by the main counter in accordance with the number of input pulses to approximate the ideal one to one pulse ratio.

The apparatus of this invention will become more readily apparent by reference to the attached drawings, in which.

Figure 1:
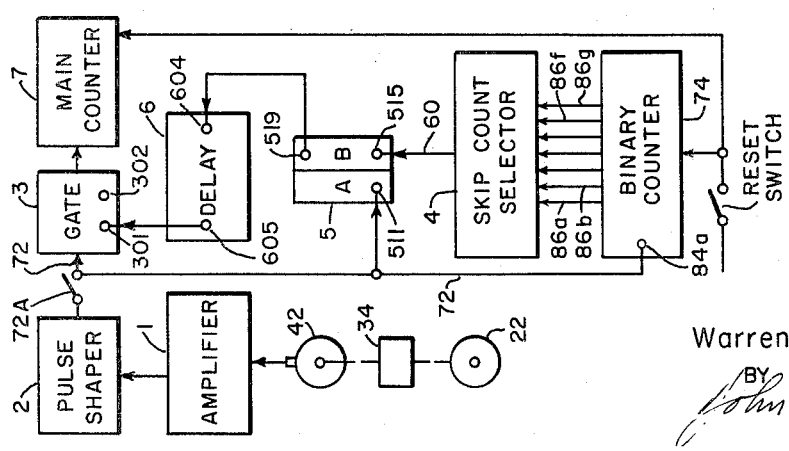
FIGURE 1 is a block diagram showing of one embodiment of the present invention.

Referring to the drawings by characters of reference and particularly to FIG. 1, a tachometer 42 supplies input pulses for the digital integrator. The rate at which the tachometer 42 provides pulses is a measure of the speed and the number of the pulses a measure of the amount of material such as paper being processed or steel being rolled and passing over the roll 22. The tachometer 42, in the embodiment shown in FIG. 1, is arranged so that it puts out more pulses than is dictated by the amount of material being measured. An amplifier 1 and pulse shaper 2 are included to make the shape of the tachometer signals suitable for operating the digital circuitry.

Two counters 7 and 74 are utilized. The main counter 7 stores a count which is proportional to the quantity being measured. The binary counter 74 counts the input pulses and through the skip count selector 4 determines which of the pulses supplied by the tachometer 42 are to be kept from actuating the main counter 7 so that the totalization of the counts by the main counter 7 will, within a predetermined degree of accuracy, be a true indication of the desired count level. A flip-flop 5 acts through a delay circuit 6 and a gate circuit 3 to cause the main counter to skip the desired counting input pulses. The amplifier 1, pulse shaper 2, gate 3 and main counter 7 are standard apparatus similar to the amplifier and shaper 30, gate 32, and counter 34 shown in copending application, Serial No. 6268, filed February 2, 1960 by Warren J. Schmidt et al., entitled "Measuring Apparatus" (now U.S. Patent No. 3,058,223 dated October 16, 1962) and assigned to the same assignee as is this application.

The flip-flop 5 has two transistor stages A and B with one input stage A responsive to the output of the pulse shaper 2 and the second input stage B responsive to the output conductor 60 of the skip count selector 4. The output of the flip-flop 5 is taken from the output terminal 519 of stage B and feeds the input terminal 604 of the delay circuit 6. The flip-flop 5 is operative such that an input to stage A will place the output terminal 519 at ground potential or zero voltage level. This output will hold at the zero voltage level until an input signal to the input terminal 515 of stage B flips the flip-flop 5 so that the output terminal 519 will go to a negative voltage level.

The gate circuit 3 is operative to pass input pulses from the pulse shaper 2 to the main counter 7 if there is a zero level output signal on the delay circuit 6. If there is a negative voltage signal from the delay circuit 6, no pulses will pass from the pulse shaper 2 to the main counter 7.

In general, the circuit of FIG. 1 operates as follows: a roll 22 in non-sliding contact with the material to be measured drives a pulse producing tachometer 42 through a suitable gear box 34 so that the pulses will occur at a frequency which closely approximates but which may not exactly equal the unit rate at which the material is passing over the roll 22. The input pulse signals from the tachometer 42 are amplified by the amplifier 1, shaped by the circuit 2, and fed to the main counter 7 and to the binary counter 74 simultaneously. Periodically, the skip count selector will energize the input terminal 515 of the flip-flop 5 which acts through the delay 6 to close the gate 3 for a time period sufficient to block the next tachometer pulse from reaching the main counter 7. The resultant effect is to subtract a pulse from the counter and bring the indicated measurement of the total circumferential travel of the roll to a value more nearly equal to the actual true value.

Figure 3:
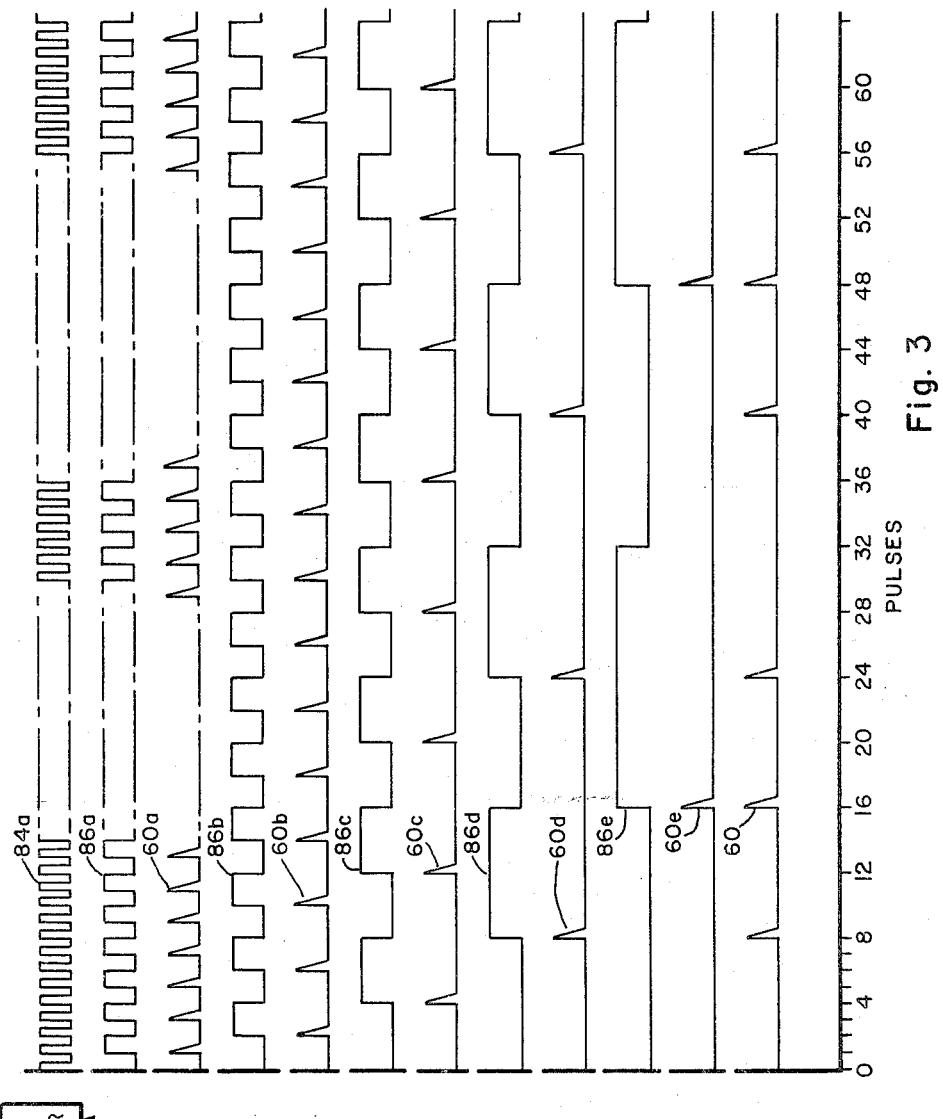
FIG. 3 is a graphical representation of some of the electrical signals produced by the circuit of FIG. 2.

As will be more particularly brought out below in connection with the more detailed description of FIG. 3, the pulses supplied from the pulse shaper 2 are applied to the input terminal 84a of the binary counter 74 and the input terminal 511 circuit to part A of flip-flop 5. The speed of operation of the binary counter 74 and of the selector 4 is extremely fast so that when the skip count selector 4 is effective to acutate the flip-flop 5 pulses could be supplied to the flip-flop 5 sections A and B concurrently. In order that the signal supplied to terminal 515 via conductor 60 from the skip count selector 4 will dominate, the actuator for the section B is provided with a longer time constant than that of the section A. This insures that gate 3 will be closed in response to each output signal of the skip count selector 4.

The output pulse delivered by the pulse shaper 2 next following the pulse which caused the gate 3 to be closed is applied concurrently to the input of the gate 3 and to the terminal 511 of the flip-flop 5. The flip-flop 5 is fast acting and to insure that the flip-flop 5 does not open the gate 3 during the existence of this pulse, the delay 6 prevents the flip-flop 5 from opening the gate 3 until after this "next following pulse" has terminated thereby eliminating any possibility that this "next following pulse" could actuate the main counter 7.

Figure 2:
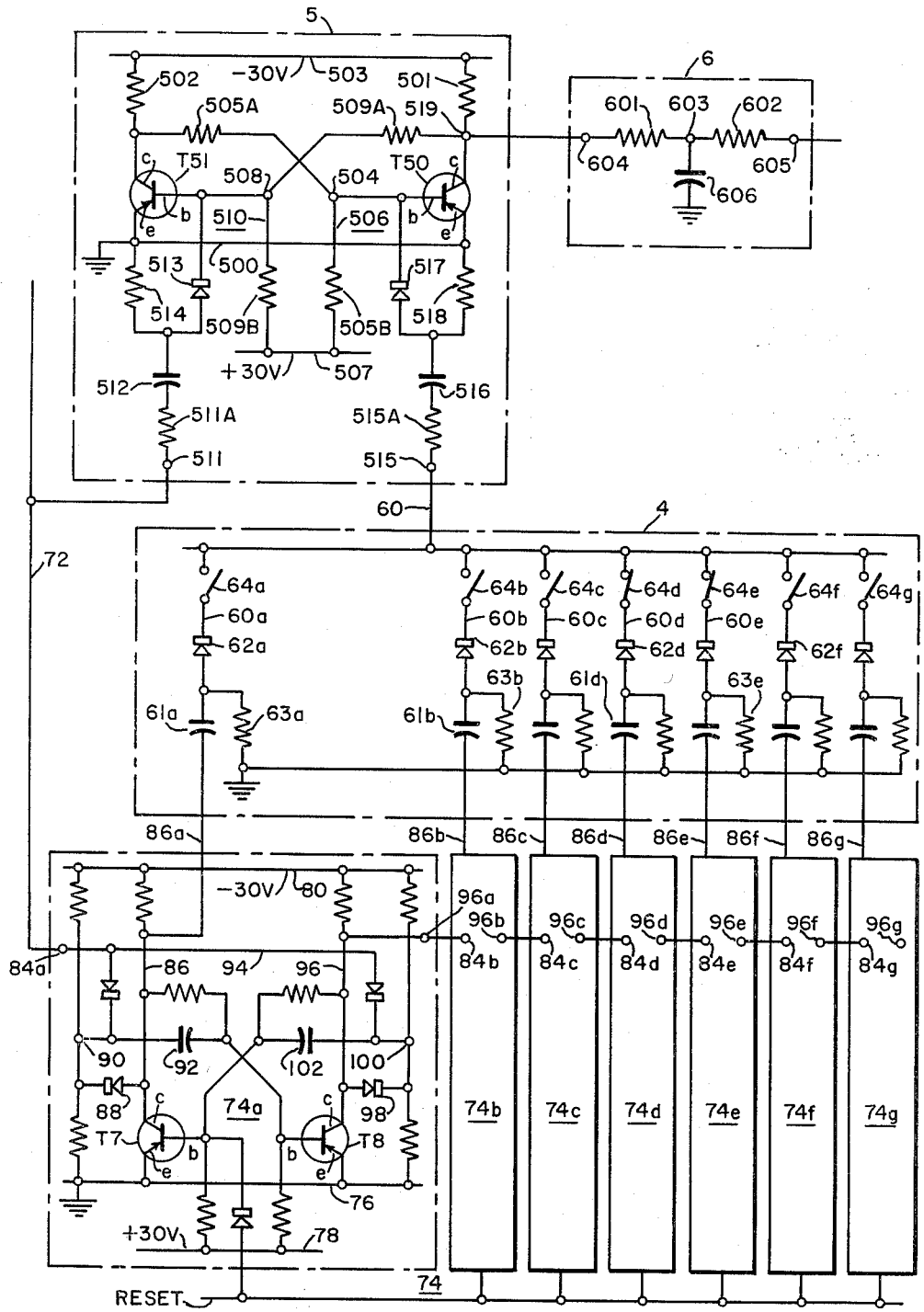
FIG. 2 is a schematic showing of some of the circuitry used in the blocks of FIG. 1.
Figure 4:
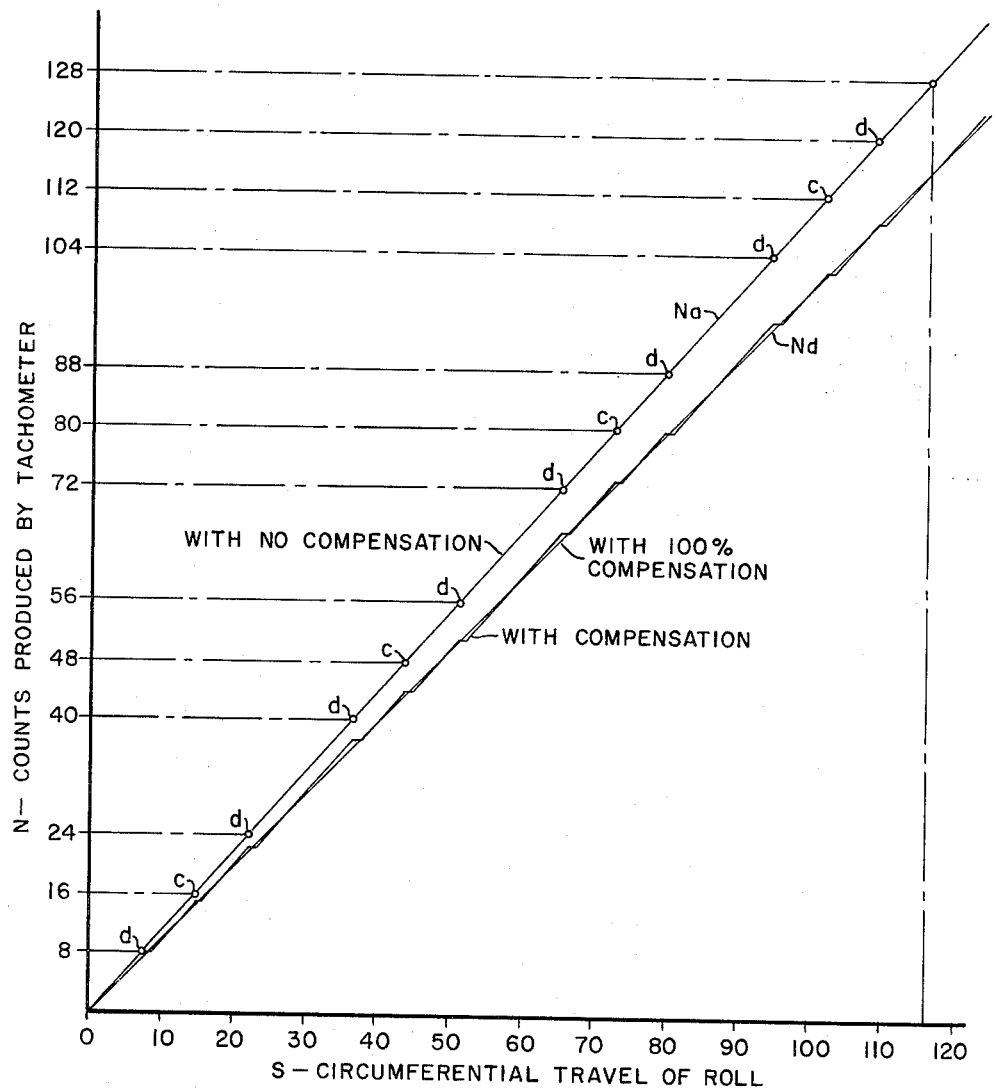
FIG. 4 is a curve showing the results of the operation of the invention embodied in FIG. 1.
Figure 5:
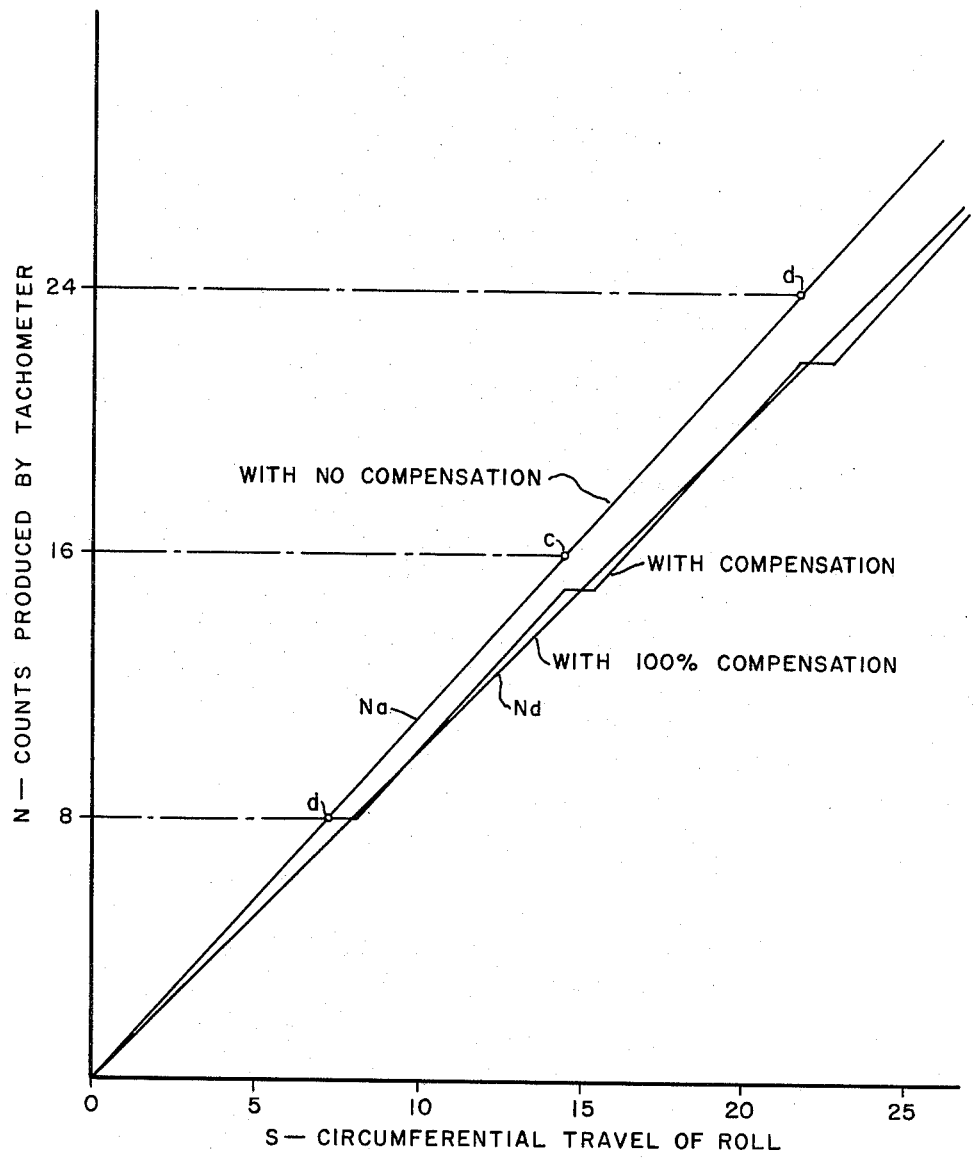
FIG. 5 is an enlarged view around the origin of the curve in FIG. 4.

An important feature of this invention is the manner in which the binary counter 74 and the skip count selector 4 operate and how the adjustment is made to add to or subtract from the number of input pulses supplied by the tachometer 42 so that the totalization of the counts as made by the main counter 7 will indicate the true measurement within the desired degree of error irrespective magnitude of the measurement. This will be described in detail with reference to FIG. 2. The number of stages in the binary counter 74 determines the resolution with which the ratio of stored to input counts may be changed. For example, a ten-stage binary counter would allow the ratio to be changed by one part in 1024 or approximately .1%. A seven-stage counter 74, comprising stages 74a–74g and skip count selector 4 with stages a–g are shown in FIG. 2 with its switches set as shown, provides skip pulses according to the following table and a result as illustrated in FIGS. 4 and 5.

Table 1

| Binary Stage | Input Pulses for each Skipping Pulse | Skipping Pulses Generated During a Binary Cycle | Percent Change in Ratio if Pulses are Skipped |
|---|---|---|---|
| 74a | 2 | 64 | 50 |
| 74b | 4 | 32 | 25 |
| 74c | 8 | 16 | 12.6 |
| 74d | 16 | 8 | 6.25 |
| 74e | 32 | 4 | 3.125 |
| 74f | 64 | 2 | 1.5625 |
| 74g | 128 | 1 | .78125 |

Any change in the ratio of input pulses to stored pulses may be derived by adding together combinations of the various percent changes available. For instance, if skipping pulses from the $d$ and $e$ stages were selected $8+4=12$ pulses would be skipped out of every 128 pulses received and the ratio of stored count to input count would be 116/128, a change of 12/128 or 9.375% (6.25%+3.125%).

The binary counter 74 is composed of multi-vibrator circuits or sections 74a, 74b, 74c, etc. Seven have been illustrated but, as suggested above, a greater number may be utilized with a resulting increase in percentage accuracy. The section 74a, is representative of all of the sections making up the binary counter 74 and comprises a pair of transistors T7 and T8 which are connected between the potential buses 76 and 80. In the zero count or reset condition the transistor T8 would be normally conducting.

As stated previously, the pulse shaper 2 is similar to the amplifier and shaper 30 of the above-mentioned application S.N. 6,268 and the input terminal 84a would be connected to the output terminal 72 of the amplifier and shaper 30 of said application. When the buses 76, 78 and 80 are initially energized with ground potential +30 volts and −30 volts, respectively, one of transistors T7 and T8 will commence to conduct. For purposes of explanation, let it be assumed that in each stage the transistor T8 conducts and transistor T7 is blocked. If this assumption is not borne out, it usually will make no material difference and results in the initiation of a cycle from a different initial condition. If for any reason it becomes desirable to insure that all of the transistors T8 conduct at any one particular instant, the counters 74 are each provided with a reset connection which when energized applies a positive pulse to the base of the transistors T7 thus insuring that the transistors T7 are all non-conductive with the results that all of the transistors T8 will be conductive.

The conducting transistor T8 maintains the potential of its collector $c$ and the conductor 96 which is connected thereto at substantially that of the bus 76. A rectifier 98 is connected between the conductor 96 and an intermediate potential point 100 of a voltage divider connected between the buses 76 and 80. Therefore, when transistor T8 conducts the point 100 will also be maintained substantially at ground potential.

The base $b$ of the transistor T7 is connected through a first resistor to the positive potential bus 78 and through a second resistor to a conductor 96. Therefore, as long as the transistor T8 conducts to maintain the potential of the conductor 96, at ground potential the voltage dividing effect of the resistors in the base circuit of the transistor T7 will hold the potential of its base $b$ sufficiently above the potential of the emitter $e$ to prevent the transistor T7 from conducting.

Similarly the base $b$ of the transistor T8 is connected through a first resistor to be the positive potential bus 78 and through a second resistor to the conductor 86 which is connected to the collector c of the transistor T7. With transistor T7 not conducting, the potential of the conductor 86 is substantially below ground potential. The values of the last-named resistors of the last-named divider are so related that when they are connected between the bus 78 and a potential substantially below ground potential, the potential of the base of the transistor T8 will be maintained at a potential value to maintain the transistor T8 conducting which potential will normally be only slightly below ground potential. The conductor 86, like the conductor 96, is connected through a rectifier 88 to an intermediate point 90 of a voltage divider connected between the buses 76 and 80. With the transistor T7 in a non-conducting condition, the conductor 86 is at a lower potential than point 90 and rectifier 88 acts as a switch so that point 90 may assume a potential above that of the conductor 86 and which potential is dependent upon the values of its divider resistances.

One terminal of a capacitor 92 is connected to the base b of transistor T8 and the other terminal thereof is connected to the point 90 whereby the capacitor 92 will be charged to potential difference between that of the base b of transistor T8 and of the point 90. Similarly a capacitor 102 is connected between the base b of the transistor T7 and the point 100. Since with transistor T8 conducting, the point 100 is maintained substantially at a potential which is substantially ground potential, the potential across the capacitor 102 will be substantially zero. Therefore, when the potential of the input terminal 84a is raised from a value substantially below to substantially ground potential there is no effect as far as the transistor T7 is concerned since the terminal of the capacitor 102 connected to point 100 is already at ground potential and the potential of the base b of transistor T7 is not substantially changed.

The increase in potential of control bus 94 does, however, raise the potential of the point 90 to substantially ground potential. Since the charge on capacitor 92 does not instantaneously change, the potential of the base of tarnsistor T8 is momentarily raised sufficiently to reduce the conduction through transistor T8. This causes the potential of the bus 96 to decrease and lower the potential of the base b of the transistor T7 sufficiently to cause it to commence to conduct. Eventually through regenerative action transistor T7 becomes fully conductive and transistor T8 reaches its fully blocked condition.

With the transistor T8 fully blocked, the potential of the conductor 96 is lower than the ground potential by an amount sufficient to maintain transistor T7 fully conducting. With the transistor T7 fully conductive, the potential of the bus 86 increases substantially to ground potential thereby raising the potential of the base of the transistor T8 to maintain the transistor T8 blocked. The next time the potential of the input terminal 84a is raised from a negative potential to substantially ground potential, the transistor T7 will cease conducting. The transistor T8 will again conduct in substantially the manner described above in connection with the conduction of transistor T7 and the rendering of the transistor T8 non-conducting. Subsequent increases in potential of bus 94 will continue to flip the multivibrator 74a.

Each of the sections 74a–74f are provided with output terminals 96a–96f which are connected to the input terminals 84b–84g, respectively, of the sections 74b–74g. Positive pulses at the output terminals actuate the respective next sections as illustrated.

The collector of transistor T7 is connected through conductor 86a to a capacitor 61a of the skip count selector 4. The capacitor 61a is connected through a resistor 63a to a grounded bus and through a diode 62a, conductor 60a and switch 64a to the conductor 60. In similar fashion capacitors, resistors and diodes are connected between each multivibrator stage of the counter 74 to the conductor or bus 60. The switches 64a, 64b, 64c, etc., are opened or closed in accordance with the desired change in the ratio of input stored pulses as explained above.

Whenever the collector of the transistor T7 changes potential from a negative value to substantially ground potential a positive pulse is produced at the upper terminal of the capacitors 61a–61g associated with the respective sections 74a–74g. With the switches 64d and 64e closed and the remainder open the pulses from the sections 74d and 74e only are transmitted to the line or bus 60. When the collector voltage of transistor T7 goes from substantially ground potential to a negative potential, a negative pulse is produced through the capacitor 61a, and the resistor 63a to ground. The negative pulse is unable to pass through the diode 62a and therefore does not reach the line 60.

It will be readily appreciated that since all of the multivibrator sections of the counter 74 are similar and are connected in sequence, the first of the actuated multivibrators 74a will be actuated at one half the frequency of the input pulses from the digital tachometer 42, the second multivibrator 74b will be operated at one quarter of the frequency, the third 74c at one eighth frequency and each additional multivibrator will halve the frequency of the preceding multivibrator. The curves 84a, 86a, 86b, 86c, etc., represent the pulses supplied by the identically designated conductors which extend from the binary counter 74 to the skip count selector 4.

The stage A of the flip-flop 5, shown in detail in FIG. 2, comprises the transistor T51 and the stage B the transistor T50. The stages are said to be actuated when its respective transistor is non-conducting. Normally the flip-flop is maintained with its transistor T50 conducting and transistor T51 blocked as a consequence of the normal flow of positive pulses from the tachometer 42 through the shaper 2.

The flip-flop 5 is a bistable device comprising a pair of transistors T50 and T51 having their emitters e connected to a grounded bus 500 and their collectors c connected through individual resistors 501 and 502 respectively to a bus 503 normally maintained at 30 volts negative with respect to ground bus 500. The base b of the transistor T50 is connected to a common point 504 of a first pair of resistors 505A and 505B comprising a voltage divider 506. The free end of resistor 505A is connected to the collector c of the transistor T51 and the free end of resistor 505B is connected to a positive bus 507 which is normally maintained at 30 volts positive with respect to ground bus 500. Similarly the base b of transistor T51 is connected to a common point 508 of a second pair of resistors 509A and 509B comprising a second voltage divider 510. The free end of resistor 509A is connected to the collector c of the transistor T50 and the free end of the resistor 509B is connected to the positive bus 507. The transistors T50 and T51 may be independently rendered non-conductive by positive signals applied to their bases b by bus 60 and the pulse supplying bus 72. The bus 72 connects the output of the shaper 2 to the input terminal 511 of flip-flop 5, the input of the gate 3, and the input terminal 84a of the counter 74. The terminal 511 is connected to the base b of the transistor T51 through a resistor 511A, a capacitor 512 and a rectifier 513. A resistor 514 connects the capacitor 512 to the ground bus 500.

The skipping bus 60 is connected to the input terminal 515, which terminal is connected to the base b of the transistor T50 through a resistor 515A, a capacitor 516, and a rectifier 517. The capacitor 516 is connected to grounded bus 500 through a resistor 518. The output from the flip-flop 5 is taken from the output terminal 519 which is connected to the collector c of the transistor T50.

Normally the skipping bus 60 is deenergized so that the potential of the base b of the transistor T50 is primarily determined by the voltage divider 506. The positive pulses normally delivered to the bus 72 from the pulse shaper 2 act to periodically elevate the potential of the base $b$ of the transistor T51 and thusly to periodically render the transistor T51 non-conductive. During non-conduction of the transistor T51, the voltage divider 506 is connected between the bus 507 and a potential only slightly above that of the bus 503 whereby the point 504 thereof, in the absence of a signal on skipping bus 60, maintains the potential of the base $b$ of the transistor T50 sufficiently below ground potential to render transistor T50 conductive. With the transistor T50 conducting, the divider 510 is connected between the bus 507 and a potential which is substantially ground potential whereby the divider 510 will maintain the potential of the base $b$ sufficiently elevated to maintain the transistor T51 non-conductive.

The normal operating condition of the flip-flop is with the transistor T50 conducting and the transistor T51 blocked. It will be apparent that if the transistor T50 is held blocked after the disappearance of the blocking signal, applied as a consequence of the energization of the bus 72, that the voltage divider 510 will cause the transistor T51 to conduct since the divider 510 will then be connected between the bus 507 and a potential of slightly higher than that of the negative bus 503. With the transistor T51 conducting, the divider 506 is connected between the bus 507 and a potential only slightly below ground potential so that the divider 506 will maintain the transistor T50 non-conductive after the disappearance of the blocking signal.

The RC time constants of the capacitor 512 and its associated resistors and of the capacitor 516 and its associated resistors determine the length of time that the transistors T51 and T50 are held non-conductive due to the application of a positive pulse on the buses 72 and 60 respectively. The time constant of the capacitor 516 and its associated resistors is made longer than that of the capacitor 512 and its associated resistors so if both buses 72 and 60 are concurrently energized, the signal on the skipping bus 60 will be the dominating signal.

The delay network 6 comprises a pair of series connected resistors 601 and 602 having a common connection 603 and free end connected to terminals 604 and 605. A capacitor 606 is connected between the connection 603 and ground. The input terminal 604 is connected to the output terminal 519 of the flip-flop 5. The output terminal 605 is connected to the gate control terminal 301 which connects with the base of a transistor therein corresponding to the transistor T11 of the gate 32 of said copending application Serial No. 6,268. Since the transistor T50 normally conducts, the potential of the terminal 519 is normally substantially at ground potential. When a skipping pulse signal flips the flip-flop 5, the transistor T50 becomes non-conductive as set out above and the potential of the terminal 519 suddenly is lowered in potential to the value determined by 501 and 509A Divider. The charge on the capacitor 606 cannot instantaneously change and a certain time delay elapses before the changed potential of the output terminal 519 is reflected to the base of the normally conducting transistor of the gate 3 which is equivalent to the transistor T11 of the copending case 6,268. This delay interval is in the main due to the impedance of the resistors 601 and 602. At the end of the time delay interval the capacitor 606 charges with the connection 603 at a potential intermediate that of the base of the gate transistor and that of the bus 503 with the result that the gate transistor is held conductive even though pulses are supplied thereto over the conductor from the shaper 2. This is the gate closed condition of the gate 3.

When the pulse to be skipped (not counted) is supplied to the conductor 72, it immediately flips the flip-flop 5 whereby the transistor T50 again becomes conductive to raise the potential of the output terminal 519 substantially to ground potential. At the end of the delay interval of the delay circuit 6, the gate 3 opens and passes subsequent pulses from the conductor 72.

FIG. 4 illustrates the skipping action of the system shown in FIGURE 1 when determined in accordance with the following symbology.

*Table II*

$q$=tachometer revolutions÷roll revolutions
$C$=roll circumference
$n$=number of teeth on tachometer
$Na$=number of pulses put out by tachometer
$Nd$=desired count
$S$=circumferential distance traveled by roll The error between the output pulses of the tachometer and the count desired in the main counter 7 is $Na-Nd$. Since the desired count $$Nd = Na\left(\frac{C}{qn}\right)$$

the error equals $$Na\left(1-\frac{C}{qn}\right)$$

$Nd$, the desired count, should equal $S$, the circumferential distance traveled by the roll and $$Na = \frac{Sqn}{C}$$

The desired count should follow the $Nd$ curve of FIGURE 4 so that the count is equal to the feet of paper that has passed over the roll. The actual count produces the $Na$ curve indicating that more pulses are generated than are needed. The curves shown in FIGURE 4 are for a seven stage binary counter and skip count selector which is able to correct the input count to a resolution of one part in 128. If the solution of the equation $$Na = \left(1-\frac{C}{qn}\right)$$

shows an error of twelve parts in 128, the stages of the binary which should be used are determined as follows:

*Table III*

| Stage | Correction Supplied | Stages Used |
|---|---|---|
| g | 1 | |
| f | 2 | |
| e | 4 | 4 |
| d | 8 | 8 |
| c | 16 | |
| b | 32 | |
| a | 64 | |
| Total Correction | | 12 |

This indicates that the $e$ stage yields four skip pulses every 128 counts and the $d$ stage yields eight skip pulses for ever 128 counts.

In FIG. 4, the $Na$ curve represents the pulses supplied to the binary counter 74. The letters along this curve indicate time of and which skip count selector causes the main counter to skip the succeeding count so that the main counter 7 will closely follow the accurate curve. As set up the instrument would compensate exactly for an error of 12 parts in 128 pulses received or 116 units of measure. The actual count curve would never deviate more that one count from the desired curve. If it turns out that greater resolution is desired in the fineness with which the corrections should be made, additional stages can be added to the binary counter 74 and the skip count selector 4. A switch may be used to start and stop the counting operation.

Figure 8:
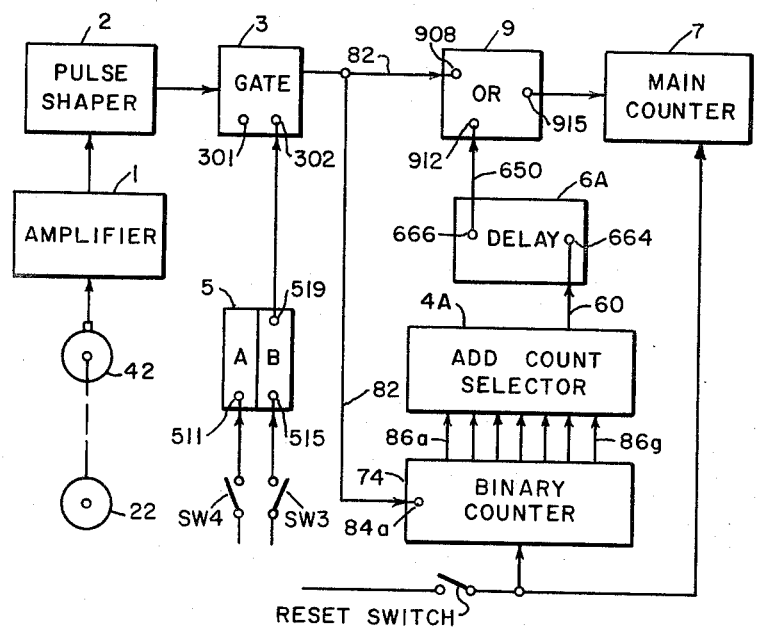
FIG. 8 is a block diagram of a second embodiment of the invention.

FIG. 8 is a block diagram representation of the invention when the tachometer 42 supplies a lesser number of pulses than the actual measurement so that proper compensation is provided by adding pulses to the main counter 7.

Pulses from the tachometer 42 are amplified in the amplifier 1, shaped in the shaper 2 and during the counting interval, are passed through the gate 3, conductor 82 and OR network 9 directly to the main counter 7. The conductor 82 is also connected to the binary counter 74 which acts through the add count selector 4A to energize the mono-stable multivibrator delay network 6A. The delay time afforded by the network 6A is slightly greater than one-half cycle of the output pulse supplied by the conductor 82 so that the main count 7 is actuated by the add count selector 4A after its actuation by the tachometer pulse.

Figure 6:
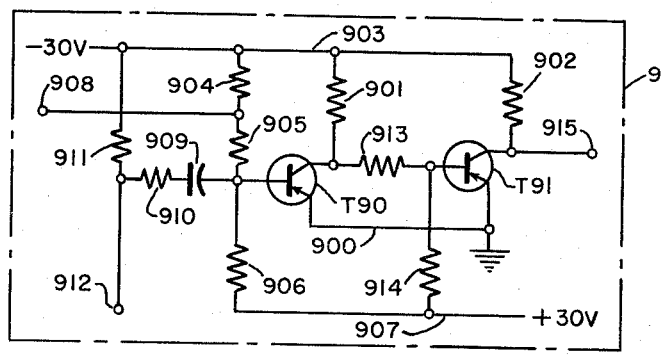
FIG. 6 is a schematic diagram of the OR network.

A typical OR network 9 is illustrated in FIG. 6 and comprises a pair of transistors T90 and T91 each having its emitter connected to ground bus 900 and their collectors individually connected through resistors 901 and 902 to a bus 903 maintained at negative 30 volts with respect to ground. A voltage divider comprising series connected resistors 904, 905, and 906 is connected between the bus 903 and a positive potential bus 907 maintained at positive 30 volts with respect to ground bus 900. The free end terminals of the resistors 904 and 906 are respectively connected to the buses 903 and 907. The base of the transistor T90 is connected to the common point between resistors 905 and 906. The common point of resistors 904 and 905 is connected to a first input terminal 908. A capacitor 909 has one of its terminals connected to the base of transistor T90 and the other of its terminals connected through resistors 910 and 911 to the negative bus 903. The common point of resistors 910 and 911 is connected to a second input terminal 912. A voltage divider comprising a first and second resistor 913 and 914 is connected between the collector of the transistor T90 and bus 907. The base of the transistor T91 is connected to the common point of the resistors 913 and 914 while the collector is connected to an output terminal 915.

In the absence of input signals to the input terminals 908 and 912, the resistors 904–906 will maintain the transistor T90 conducting. With transistor T90 conducting, the resistors 913 and 914 are connected between the bus 907 and a point maintained substantially at ground potential whereby the potential of the base of the transistor T91 is maintained sufficiently elevated to keep the transistor T91 blocked. With transistor T91 blocked, the potential of its collector and of the output terminal 915 is maintained substantially below ground potential. When a signal is applied to the input terminal 908, the potential thereof is raised substantially to ground potential. This, in effect, connects the resistors 905 and 906 between ground potential and +30 volts whereby the potential of the base of transistor T90 is sufficiently elevated to cause blocking of the transistor. When transistor T90 blocks, the resistors 901, 913, and 914 are connected between the buses 903 and 907. The magnitudes of these resistors 901, 913 and 914 are such that the potential of the base of transistor T91 is sufficiently lowered so that transistor T91 conducts. This raises the potential of the output terminal 915 substantially to ground potential to actuate the counter 7 as set forth in the said copending application Serial No. 6,268. Similarly, an increase in potential of the input terminal 912 will result in the blocking of the transistor T90, the conduction of the transistor T91 and an increase in the potential of the output terminal 915 to actuate the main counter 7.

As will be explained in greater detail below, the normal condition of the network 6A is such as to maintain the potential of its output conductor 650 and consequently the input terminal 912 substantially at ground potential. The difference in potential between that of the terminal 912 and that of the bus 903 appears across the resistor 911. Under this condition, the resistors 904, 905, and 906 maintain the potential of the base of the transistor T90 and the terminal of the capacitor 909 connected thereto at a potential somewhat below ground potential and consequently negative with respect to the other terminal of the capacitor 909 which is connected to the terminal 912 through the resistor 910. When the network 6A is actuated by the add count selector 4A, it reduces the potnetial of the conductor 650 without immediate effect on the conductive condition of the transistor T90. Such reduction in potential does, however, cause the capacitor 909 to assume a charge in which whereby the terminal thereof connected to the resistor 910 is negative with respect to the terminal thereof which is connected to the base of the transistor T90. This change in potential does not occur instantaneously but, however, does occur during the time that the network 6A maintains the output terminal below ground potential.

At the end of the delay interval afforded by the network 6A, which interval is preferably somewhat longer than the duration of the pulses supplied by the shaper 2, the potential of the conductor 650 and of the input terminal 912 is again raised substantially to ground potential. This in turn raises the potential of the terminal of the capacitor 909 which is connected to the resistor 910. Since the charge on the capacitor 909 cannot instantaneously change, the potential of the base of the transistor T90 resulting in the conduction of the transistor T91, the raising of the potential of the output terminal 915 and a registration of an add count on the main counter 7.

The delay network 6A comprises a pair of transistors T52 and T53 each having its emitter connected to a ground bus 651 and the collectors thereof are connected through individual resistors 652 and 653 to a negative potential bus 654 which is maintained at negative 30 volts with respect to ground. The base of the normally blocked transistor T53 is connected to an intermediate point in a voltage divider comprising the resistors 655 and 656 connected between the collector of the transistor T52 and the positive potential bus 657 which is maintained at positive 30 volts with respect to ground. It will be apparent that when transistor T52 conducts, its collector is maintained substantially at ground potential and the divider will maintain the base of the transistor T53 at a sufficiently elevated potential to maintain transistor T53 non-conducting. The base of the transistor T52 is connected to an intermediate portion 658 of a voltage divider comprising resistors 659 and 660 connected between the buses 654 and 657. The divider is so proportioned that the portion 658 is normally at a potential to maintain transistor T52 conducting. This is the stable state of the multi-vibrator 6A.

In order to control the operation of the multivibrator 6A the base of the transistor T52 is connected through a rectifier 661, series connected with a capacitor 662 and a resistor 663 to an input terminal 664 which is connected to the output bus 60 of the add count selector 4A which is of identical construction to the skip count selector 4. When the bus 60 is pulsed positively due to the operation of the add count selector 4A, it applies a positive pulse to the base of the transistor T52 which thereupon blocks. This pulse is applied through the capacitor 662 and rectifier 661. When transistor T52 blocks, the potential of its collector is decreased to a voltage determined by 653–655 divider effectively connecting the resistors 655 and 656 between the bus 657 and a potential substantially below ground. This results in a lowering of the base potential of the transistor T53 which thereupon conducts.

When transistor T53 conducts, the potential of its collector increases substantially to ground potential. Since the charge on a capacitor does not instantaneously change, the potential of both plates of a capacitor 665 connected between the collector of transistor T53 and the voltage divider intermediate portion 658 raises the potential of the base of transistor T52 to maintain it non-conducting after the positive pulse on conductor 60 disappears. The transistor T52 will remain blocked until the capacitor 665 discharges sufficiently to permit transistor T52 to reconduct. When transistor T52 reconducts, the voltage dividing resistors 655 and 656 are again connected between the positive bus 657 and a potential substantially at ground to block transistor T53 so that the monostable multivibrator 6A is in its stable condition. The output terminal 666 of the monostable multivibrator 6A is connected by the conductor 650 to the input terminal 912 of the OR network 9.

The operation of the add count apparatus shown in FIG. 8 is substantially like that set forth above in connection with the skip count apparatus shown in FIG. 1. When it is desired to initiate a counting function, a positive pulse is provided at the input terminal 515 of the flip-flop 5 as by closure of the start switch SW3 which may be of the momentary closure type. This causes the potential of the output terminal to decrease thereby lowering the potential of the input terminal 302 which opens the gate 3. The control terminal 302 corresponds to the terminal 79 of the gate 32 of the said copending application Serial No. 6,268.

When the potential of terminal 302 is at ground potential, any change in conductivity of the first gate transistor (T11 of Serial No. 6,268) is ineffective to alter the conductivity of the second gate transistor (T12 of Serial No. 6,268). However, when terminal 302 is at below ground potential the change in conductivity of the first gate transistor does change the conductivity of the second gate transistor and the pulse from the shaper 2 effectively passes through the gate to the conductor 82.

When the transistor T50 blocks, the potential of the output terminal 519 decreases substantially so that as the gate transistor (corresponding to transistor T11 of application Serial No. 6,268) is blocked, the transistor corresponding to transistor T12 of said application will conduct to provide an output pulse on conductor 82 for actuating the main counter 7 through the OR network 9 and binary counter 74 directly.

The conductor 82 is also connected to the input terminal 84a of the counter 74 which controls the number of add counts to be supplied in a manner which will be apparent from the description above in connection with the skip counts.

When the add count selector 4A energizes its output bus 60, a positive signal is applied to the input terminal or connection 664 of the delay 6A. This signal causes the normally conducting transistor T52 to block resulting in the conduction of the normally blocked transistor T53. This action is, as explained above, without immediate effect on the operation of the OR network 9. At the end of the delay interval, the transistor T52 will again conduct and the transistor T51 will again block. When this occurs the potential of the output bus 650 will be raised and act through the capacitor 909 thereof to render transistor T90 blocked and transistor T91 conducting to provide an added pulse to the main counter 7. As stated above the delay interval of the network 6A is such that the positive pulse on bus 650 does not occur until after the termination of the pulse on conductor 82.

The apparatus continues to operate as described until such time as a positive pulse is provided on the input terminal 511 of the flip-flop 5. This may, for example, be applied by the closure of the switch SW4 which may be of the momentary closure type. This pulse renders transistor T51 blocked and the transistor T50 conducting. Conduction of transistor T50 raises the potential of output terminal 519 substantially to ground potential to prevent the passing of pulses from the shaper 2 to the conductor 82 and thereby terminates further counting by the main counter 7. It will be appreciated that the counter 7, in all instances, may comprise as many series units or digits as is necessary to provide the desired counted number. For simplicity only a single digit was illustrated in said copending application 6,268. In copending application Serial No. 36,046 a plural number of digit counters were illustrated.

Figure 9:
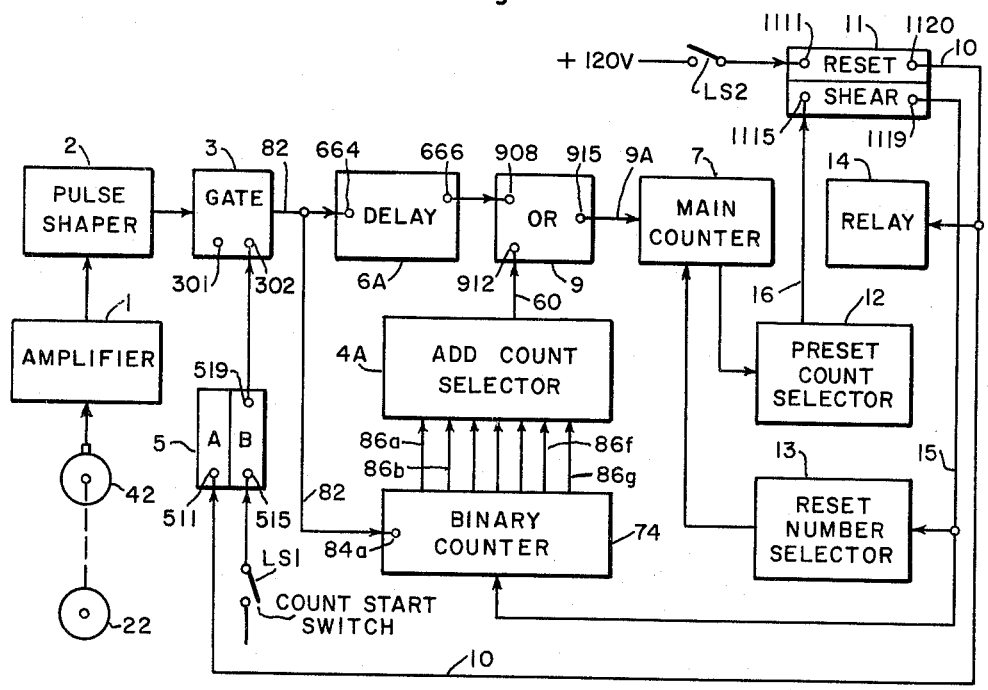
FIG. 9 is a block diagram of a further embodiment of the invention.
Figure 11:
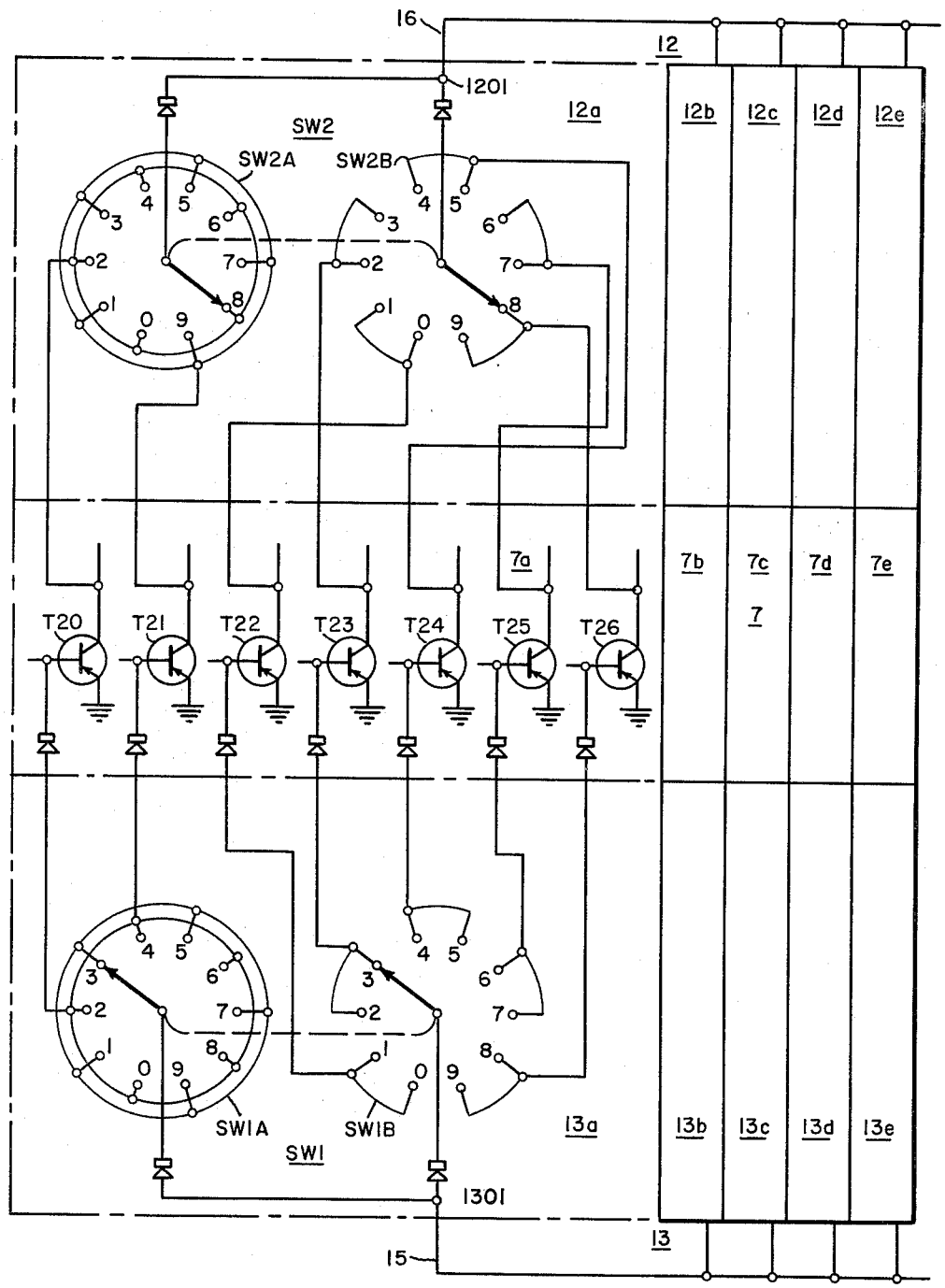
FIG. 11 is a view, partly in block form and partly in schematic form, showing the counting units and the selectors.

FIGURE 9 is a block diagram of another embodiment of the present invention which, as illustrated, operates on the "add count" principle but which obviously could operate on the skip count principle. This embodiment is especially useful in a system in which material is measured out and an operation such as shearing to length is performed on the measured material. Such a system could be a steel pipe cutting machine in which the roll 22 would be in non-sliding contact with the pipe and located forwardly of the shear (when looked at in the direction of pipe movement) and in which compensation is made for the operating time of the shear. In such an event, the digital integrator would be set up to compensate for the length of pipe which is located between the point at which the shear cuts the pipe and the roll 22 and to compensate for the length of pipe which passes by the shear during the fixed time interval which occurs between the energizations of and the actuation of the shear.

As in the previous system, the tachometer 42 supplies pulse signals which are amplified by the amplifier 1, shaped in the pulse shaper 2 and passed to the gate 3. The flip-flop 5 is actuated by a suitable signal applied to its input terminal 515 to open the gate 3 to render the counter 7 effective to count the pipe footage. This signal may be delivered as a consequence of the closure of a limit switch LS1 actuated when the pipe reaches the roll 22. When the gate 3 is open, the pulses received from the pulse shaper 2 are delivered to the output bus 82 for actuation of the main counter 7 and binary counter 74 as above described.

Figure 7:
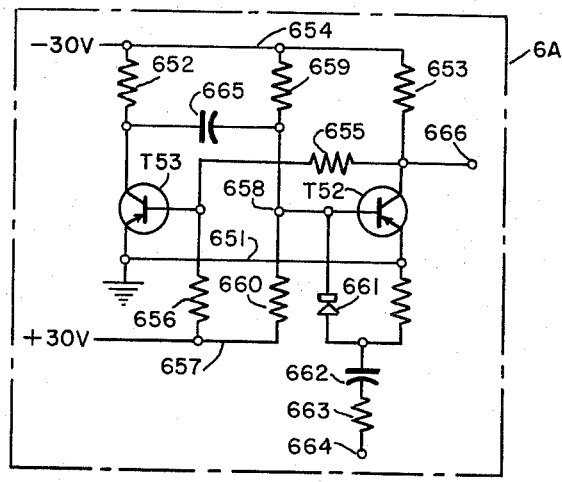
FIG. 7 is a schematic diagram of the delay timer used in FIGS. 8 and 9.

As described in connection with FIG. 7 the "add counts" are delayed and then added after the disappearance of the main pulse supplied by the tachometer 42. In the form illustrated in FIG. 9, the main pulses are delayed and the "add counts" are supplied without delay and consequently actuate the main counter 7 just ahead of the actuation of the counter by the main pulse. With this exception the operation of the counters 7 in each of the networks of FIGS. 8 and 9 are identical. Additionally, the form of FIG. 9 provides a reset number selector 13 which determines the base count to which the counter 7 is reset at the end of a counting cycle. This base count is equal to the pipe footage between the location of the shear which shears the pipe and the roll 22 plus the number of feet of pipe which will pass the shear during the interval between the time the shear is actuated and the time it actually shears the pipe. Since the time interval of operation of the shear is constant, this latter footage compensation will be of a magnitude which varies as the speed at which the pipe moves.

The main counter 7 of FIG. 9 drives a preset count selector 12 which, when the desired count has been recorded on the counter acts through the preset selector 12 and bus 16 to operate a flip-flop network 11 having output terminals 1119 and 1120 and input terminals 1111 and 1115. Operation of the network 11 by the network 12 energizes the output terminal 1120 and control conductor 10 which thereupon operates the relay 14 to cause the pipe shear to operate and also actuates the flip-flop 5 to close the gate 3. It will be apparent that added pipe footage will occur after opening of the gate 3 but this footage has already been added to the main counter 7 during the resetting operation by the setting of the selector 13. The main counter will indicate the true length of the pipe.

Upon completion of the shearing operation, a suitable switch which could be a limit switch LS2 actuated by the shear, resets the network 11 to energize output terminal 1119 and pulse the bus 15 to reset the binary counter 74 to its zero condition and actuate the reset selector 13 to reset the main counter 7. A subsequent operating cycle is initiated when the pipe again contacts the roll 22 and actuates the limit switch LS1 to reset the flip-flop 5, and open the gate 3. The switches LS1 and LS2 may be of momentary closure type.

Figure 10:
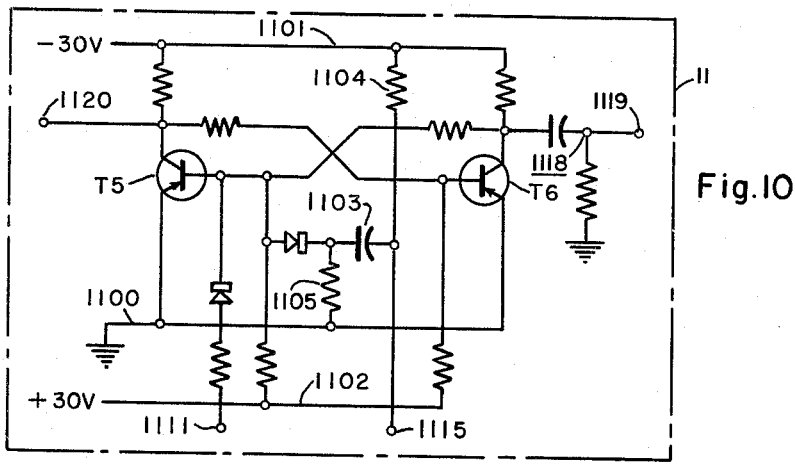
FIG. 10 is a schematic diagram of a flip-flop circuit used in FIG. 9.

The flip-flop 11 is illustrated in FIG. 10 and comprises a pair of transistors T5 and T6 each having its emitters connected to ground bus 1100. The collectors of these transistors are individually connected through resistors to a negative bus 1101 which is maintained at negative 30 volts with respect to ground bus 1100. The base of the transistor T5 is connected to an intermediate point on a potential divider connected between the collector of transistor T6 and a positive bus 1102 which is maintained at positive 30 volts with respect to ground bus 1100. Likewise the base of the transistor T6 is connected to an intermediate point on a potential divider connected between the collector of transistor T5 and the bus 1102. The network so far described is much like the network 5 and the conduction of one of the transistors T5 or T6 will hold the opposite one of the transistors T6 or T5 non-conductive as described in connection with the flip-flop 5.

The major difference between the flip-flops 5 and 11 is in the structure by which the flip-flop 11 is actuated to its two stable conditions. During counting, the transistor T6 conducts and transistor T5 is blocked. This condition is attained by a momentary closure of the limit switch LS2 which applies a positive potential to the input terminal 1111 which is connected to the base of transistor T5 through a resistor series connected with a rectifier. This positive potential when applied to the base of transistor T5 holds the transistor T5 blocked whereby the potential divider associated with the base of the transistor T6 is connected between the bus 1102 and the bus 1101 through the collector resistor of transistor T5. This reduces the potential of the base of the transistor T6 sufficiently to cause the transistor T6 to conduct. When transistor T6 conducts, the potential of the output terminal 1119 is raised substantially to ground potential to provide the energizing pulse to the conductor 15.

At the end of a counting interval the flip-flop 11 is actuated to its other stable condition in which transistor T5 conducts and transistor T6 is blocked. This causes the output terminal 1120 to be raised to ground potential and provide an energizing pulse to the conductor 10. Conduction of the transistor T5 is accomplished as a consequence of the reduction in potential of the output bus 16 of the preset count selector 12 which occurs as a consequence of the main counter 7 reaching the desired count as will be described in greater detail below.

The conductor 16 is connected to the input or control terminal 1115 which is connected to the upper terminal of a control capacitor 1103 which is connected through a resistor 1104 to the negative bus 1101. The right-hand terminal of capacitor 1103 is connected through a resistor 1104 to the negative bus 1101. The left-hand terminal of capacitor 1103 is connected to the base of the transistor T5 through a rectifier and is connected to the ground bus 1100 through a resistor 1105. As will be explained more fully below, the potential of the conductor 16 during a counting operation will be held substantially at ground potential.

During a counting operation, the transistor T6 is conducting and the base of the transistor T5 is held at a potential positive with respect to ground by the voltage divider connected to its base. Since the left-hand terminal of the capacitor 1103 is connected to the base of the transistor T5 through the diode, the potential of the left-hand terminal of capacitor 1103 will also be held above ground potential whereby the capacitor will be charged with its left-hand plate positive with respect to its right-hand plate. At the end of a counting cycle, the potential of the conductor 16 and the attached right-hand plate of the capacitor 1103 are lowered to a potential below ground potential. Since the charge on the capacitor 1103 cannot instantaneously change, this results in a reduction in potential of the left-hand terminal of the capacitor 1103 and of the base of the transistor T5 to a potential which causes the transistor T5 to conduct and the potential of the output terminal 1120 and of the adjacent end of the potential divider connected to the base of the transistor T6 to be raised substantially to ground potential. This results in a signal being supplied to the conductor 10 and the rendering of the transistor T6 blocked.

The counter 7 comprises any desired number of series connected counting units 7a, 7b, 7c, etc., the selector 12 any number of units 12a, 12b, 12c, etc. and the selector 13 any number of units 13a, 13b, 13c, etc. which are necessary to provide the desired output number. Each counting unit 7a, 7b, 7c, etc. comprises a decade, a decoder and a readout which are identical to the decade D1, the decoder A1 and the readout R1 of copending application Serial No. 36,046. Only enough of the circuitry of the counter 7 as is necessary to understand the operation of the selectors 12 and 13 is shown. In this regard only the transistors T20-T26 (which are identical with the identically numbered transistors of the copending application Serial No. 36,046) of the unit 7 and their relationship with selectors 12a and 13a are illustrated since the corresponding portions of the remainder of the counting units and selectors are identical.

The reset number selector 13a is provided with a two wafered switch SW1. Each of the wafers SW1A and SW1B have 10 contacts and a rotatable arm. A single actuator rotates both arms which arms concurrently engage corresponding contacts as the actuator is rotated. The contacts of the switch SW1 are numbered 0-9 in accordance with the ten unit counts of the digit counted by the section 7a.

Every alternate one of the 10 contacts of the wafer SW1A are connected together and to the base electrode of the transistor T20 through a rectifier. Similarly the opposite alternate contacts are connected together and to the base electrode of the transistor T21 through a rectifier. Contacts 0 and 1 of the wafer SW1B are connected together and to the base electrode of the transistor T22 through a rectifier. Similarly contacts 2-3, 4-5, 6-7, and 8-9 are connected together in pairs and the pairs individually connected to the base electrodes of the transistors T23, T24, T25 and T26 respectively through individual rectifiers. Each of the selectors 13a, 13b, 13c, etc. is provided with an input terminal 1301, all of which are connected to the resetting bus or conductor 15. As illustrated, each selector 13a, 13b, 13c, etc. has its input terminal 1301 connected through individual rectifiers to the arms of its switch SW1.

As is more fully set forth in application Serial No. 36,046, the transistors T20 and T21 are connected in flip-flop arrangement and successive input pulses thereto cause the relative conductive condition thereof to reverse. Transistor T21 will conduct on even numbered pulses and transistor T20 will conduct on odd numbered pulses. The transistors T22-T26 are ring connected and each time that the transistor T21 goes from a blocked to a conducting condition, the non-conducting transistor of the ring of transistors progressively moves about the ring. At the zero count the transistors T20 and T22 are non-conducting and transistors T21 and T23-T26 are conducting. The ring transistors T22-T26 are sequence each time that conduction of the transistor T21 is initiated as a consequence of an even numbered pulse rendering the transistor T20 non-conducting.

Resetting is accomplished by raising the potential of the conductor 15 to ground potential. This raises the potential of the base electrodes of the two transistors which are connected by the switch SW1 to the conductor 15, thereby resetting the counting unit associated therewith in accordance with the position of its respective said switch SW1. As illustrated, the unit 7a will be reset to a count of 3.

The present count selector 12a comprises a two wafered switch SW2 having wafers SW2A and SW2B and is like switch SW1. Wafer SW2A has its even numbered contacts connected together and to the collector electrode of the transistor T20 and its odd numbered contacts connected together and to the collector electrode of the transistor T21. The 0–1, 2–3, 4–5, 6–7 and 8–9 contacts of the SW2B wafer are connected together in pairs and the pairs are individually connected to the collector electrodes of the transistors T22, T23, T24, T25 and T26 respectively. The arms of the switch SW2 are connected to its output terminal 1201 through individual rectifiers. During the odd numbered counts of the unit 7a, the even numbered contacts of wafer SW2A will be held at ground potential and the odd numbered contacts will be at below ground potential and vice versa. At counts 0–1, 2–3, 4–5, 6–7, and 8–9 the pairs of contacts 0–1, 2–3, 4–5, 6–7 and 8–9, individually and sequentially will be reduced and maintained at below ground potential with the remaining pairs of the contacts 0–1, 2–3, 4–5, 6–7 and 8–9 being maintained at substantially ground potential. The terminal 1201 is maintained at substantially ground potential except when the counting unit 7a attains the count corresponding to the present conditions of the switch SW2 at which time it is reduced below ground potential to pulse the input terminal 1115 of the flip-flop 11. In the illustrated embodiment this would be when the counting unit 7a registers a count of 8.

All of the terminals of the selector sections 12a, 12b, 12c, etc. corresponding to terminal 1201 of the sections 12a are connected to the conductor 16. The conductor 16 is therefore maintained substantially at ground potential until all of the counting units register the count for which their respective switches SW2 are adjusted. When this occurs the potential of the conductor 16 drops to a potential substantially below ground potential to flip the flip-flop 11 to pulse the conductor 10. This pulse actuates the relay 14 to operate the shear to cut the pipe and actuates the flip-flop 5 to close the gate 3 to clamp the footage count on the counter 7. Subsequently the shear actuates the limit switch LS2 to return the flip-flop 11 to its condition in which transistor T6 conducts. This pulses the conductor 15 through a capacitor resistor combination 1118, to reset the counter 7 and the binary counter 74. The purpose of the combination 1118 is to establish a finite interval of energization of the output terminal 1119 irrespective of the period that switch LS2 remains closed. If switch LS2 is of the momentary closure type, the combination 1118 may be omitted. When subsequently the limit switch LS1 is closed, as a consequence of the pipe again engaging the roll 22, the flip-flop 5 is flipped into a condition in which transistor T50 is conducting to open the gate 3 to permit the tachometer 42 to again energize the conductor 82 for a subsequent operation.

While only a limited number of embodiments of the present invention have been illustrated and described in detail, numerous modifications are possible and it is desired to cover all modifications falling within the spirit and scope of the invention.

What is claimed and is desired to be covered by United States Letters Patent is as follows:

1. A digital integrating system responsive to the magnitude of a quantity measured in first units and providing the measurement indication in terms of second units which are of a magnitude different than the magnitude of said first units, the combination of a generator for generating electrical pulse signals as a function of the number of said first units in said quantity, a main counter for totalizing the number of counter signals applied thereto, circuit means connected to said generator and to said main counter, said circuit means normally supplying counter signals to said counter in a number which bears a predetermined constant fixed ratio to the number of said pulse signals generated by said generator whereby the rate of totalizing of the number of said counter occurs as a fixed constant function of the number of said pulse signals generated by said generator, and control means connected to said circuit means to difference the number of said counter signals supplied to said main counter from the number of said pulse signals supplied to said circuit means by said generator, said control means being actuated in response to each accumulation of a desired number of said pulse signals generated by said generator, each said desired number being substantially equal to the number of said one signals which results in an error of not substantially greater than one in the totalization of said second units by said counter whereby the error in the count totalized by said counter is maintained substantially within an error of not substantially greater than plus or minus one count.

2. The digital integrating system of claim 1 wherein said first units are larger than said second units and a single pulse signal is added to said main counter every time said desired number of said one signals is supplied 3. The digital integrating system of claim 1 wherein said first units are smaller than said second units and a single signal is prevented from being supplied from said source to said main counter by said control means each time said desired number of said one signals is supplied.

4. The digital integrating circuit of claim 1 wherein said control means includes a multi-stage binary counter connected to and driven by the electrical pulse signals of said source and wherein the output signal of at least one stage of said binary counter is connected to control said circuit means to difference the number of said pulse signals supplied by said source to said main counter.

5. The digital integrator of claim 4 wherein the circuit means includes a gate circuit normally opened to allow pulse signals from said source to be supplied to said main counter and wherein the output of the connected stages of said binary counter collectively close said gating device each time said stages are placed in a predetermined condition.

6. The digital integrating system of claim 4 wherein means is provided to phase the output signals of the connected said stages of said binary counter so that they are effective at a different time than the pulse signals from said source to said circuit means.

7. The digital integrating system of claim 4 wherein the output of the connected said stages of said multi-stage counter device are operative to supply pulses to said circuit means.

8. Apparatus for digitally measuring the magnitude of a quantity represented by pulsing signals which pulse for each of first units of said quantity and in which the said first units are of a different size than the size of second units in which the said magnitude is to be determined, said apparatus comprising counter means totalizing the number of the signals produced by said first units as the magnitude of said quantity is measured, control means actuated in response to each accumulation of predetermined first numbers of said pulses and correcting means actuated by said control means for correcting the totalized number of said counter means, said correcting means being operable each time said control means responds to one of said predetermined numbers to difference the number of said totalized signals from the number of said signals which occur as a consequence of a change in said quantity which is being determined by a fixed number, said fixed number being related to the total number of each said accumulations such that said correcting means maintains the number totalized by said counter means equal to the number of said second units within a numerical error which is not greater than said fixed number.

9. In a measuring system for digitally determining the magnitude of a quantity represented by first units of said quantity which are of a first magnitude in terms of second units of said quantity which are of a second magnitude different from said first magnitude, an indicating apparatus having an input terminal and a device providing an indicated totalization of said first units which is equal to the number of said second units, pulse generating means connected to said input terminal and effective to pulse said input terminal in response to the occurrence of each said first unit, said apparatus including control means to difference the indicated totalization provided by said device from the total number of said pulses, said apparatus also including pulse actuated repeating cycling counting means for counting sequences of said pulses, said counting means having an initial count position, said counting means being provided with a plurality of output terminals arranged for energization upon an increasing number of its said count, each of said output terminals being arranged for energization at the end of individual first predetermined counts relative to said initial position and each being energized thereafter at the end of individual second predetermined counts, each of said first counts being a different number of the count of said counting means, the number of said second predetermined count being substantially twice the number of the respective said first predetermined count of the respective said terminal, and means connecting at least one of said terminals to said control means whereby said control means is rendered effective to difference said indicated totalization in accordance with the same number of equal fractional counting groups as the number of said terminals connected to said control means.

10. In a measuring system, a repeating cycling apparatus, said apparatus including a plurality of signal operated repeating cycling devices, means connecting said devices in series such that each immediately succeeding said device receives a signal upon the completion of each said cycle of the immediately preceding said device, a circuit for supplying measuring signals to the first of said devices of said series, means generating a said measuring signal for each first unit of a quantity to be measured, each of said first units being of a first magnitude, an apparatus for indicating the totality of a plurality of second units, each of said second units being of a second magnitude different from said first magnitude, at least certain of said devices having at least one control signal output, said control signal output being effective when actuated to difference, by a single signal, the number of said signals indicated by said total indicating apparatus from the number of said measuring signals, and means connecting certain of said control signal outputs to said signal control means whereby said signal control means is operated by each of said certain control signals, said certain control signal outputs of each said cycling device when taken collectively being actuated during each cycle of the repeating said cycling device to divide the cycle of the respective device into substantially equal portions.

11. In a pulse counting apparatus, main terminals adapted to be energized from a source of counter operating pulses, a counter having input terminals and means for totalizing the number of said pulses which are applied to its said input terminals, means including a gate interconnecting said main terminals and said input terminals, said gate having an open position in which said pulses may pass therethrough to said input terminals and a closed position in which said pulses are prevented from passing therethrough to said input terminals, and gate operating means responsive to a predetermined number of said pulses to actuate said gate from said open position to said closed position, said gate operating means being operable subsequent to the occurrence of a predetermined number of said pulses after actuation of said gate to said closed position to actuate said gate to its said open position.

12. In a pulse counting apparatus, a pair of main terminals adapted to be energized from a source of counter operating pulses, a counter having input terminals and means for totalizing the number of said pulses which are applied to its said terminals, means including a gate interconnecting said main terminals and said input terminals, said gate having an open position in which said pulses may pass therethrough to said input terminals and a closed position in which said pulses are prevented from passing therethrough to said input terminals, and gate operating means actuated in response to the occurence of selected number of said pulses to actuate said gate from said open position to said closed position, and means interconnecting said main terminals and said gate operating means for actuating said gate from said closed position to said open position in response to the occurrence of the next said operating pulse at said main terminals following the said operating pulse which caused said gate operating means to actuate said gate to its said open position.

13. In a pulse counting apparatus, a source of input pulses, each said pulse being of a duration not longer than a first time interval, said source having a main terminal pulsatingly energized by said input pulses, a counter having a count terminal and means for totalizing the number of count pulses applied to said count terminal, a gate having an input terminal connected to said main terminal and an output terminal connected to said count terminal and a control terminal, said gate being operable in an open condition to provide a said count pulse at its said output terminal for each said input pulse at its said input terminal and being operable in a closed condition to prevent the occurrence of said count pulses, said gate being transferred between said conditions as a consequence of a change in energization of said control terminal, a flip-flop network having two input terminals and an output terminals, means connecting said output terminal of said flip-flop to said control terminals, said flip-flop being effective in a first operating condition to actuate said gate to its said open condition and in a second operating condition to actuate said gate to its said closed condition, correcting pulse supplying means connected to a first of said two flip-flop input terminals, said corrective pulse means being energized to supply its said pulse as a consequence of the occurrence of a said totalizing input pulse which results in a predetermined number of said input pulses supplied to said counter, said corrective pulse means acting when energized to place said flip-flop in its said second operating condition, resetting pulse supplying means connected to the second of said two flip-flop input terminals and energized to supply a resetting pulse to said flip-flop as a consequence of the occurrence of a predetermined subsequent said input pulse following the occurrence of said predetermined number of said totalizing input pulse, said resetting pulse acting to place said flip-flop in its said first operating condition.

14. The combination of claim 13 in which said subsequent input pulse is the said input pulse which immediately follows said totalizing input pulse, and in which means is provided to delay the actuation of said gate to its said open conditions until the terminations of said subsequent input pulse.

15. The combination of claim 14 in which there is provided a second time delay means to delay the actuation of said gate to its said closed condition prior to the occurrence of said count pulse which occurred as a consequence of the occurrence of said totalizing input pulse.

References Cited by the Examiner

UNITED STATES PATENTS

| | | | |
|---|---|---|---|
| 2,886,243 | 5/59 | Sprague et al. | 235—197 |
| 2,921,740 | 1/60 | Dobbins et al. | 235—197 |
| 2,963,222 | 12/60 | Allen | 235—160 |
| 2,974,863 | 3/61 | Williams et al. | 235—160 |
| 3,043,508 | 7/62 | Wright | 235—160 |
| 3,055,585 | 9/62 | Bell et al. | 235—160 |
| 3,057,554 | 10/62 | Allen et al. | 235—160 |
| 3,081,031 | 3/63 | Livesay | 235—160 |
| 3,081,657 | 3/63 | Harris | 83—369 |
| 3,084,285 | 4/63 | Bell et al. | 235—160 |

MALCOLM A. MORRISON, *Primary Examiner.*